United States Patent [19]
McReynolds et al.

[11] 3,803,876
[45] Apr. 16, 1974

[54] GLASSWARE DIMPLING

[75] Inventors: James C. McReynolds; William E. Adams, both of Sapulpa, Okla.

[73] Assignee: Bartlett-Collins Company, Sapulpa, Okla.

[22] Filed: Sept. 28, 1972

[21] Appl. No.: 292,906

Related U.S. Application Data
[62] Division of Ser. No. 80,992, Oct. 15, 1970, Pat. No. 3,705,026.

[52] U.S. Cl............................ 65/70, 65/77, 65/78, 65/105, 65/113
[51] Int. Cl. .................... C03b 9/46, C03b 7/00
[58] Field of Search ............ 65/79, 77, 70, 113, 78, 65/69, 105

[56] References Cited
UNITED STATES PATENTS

| | | | |
|---|---|---|---|
| 2,512,781 | 6/1950 | Stewart | 65/69 |
| 3,184,297 | 5/1965 | Zonneveld | 65/78 |
| 3,510,287 | 5/1970 | Panczner | 65/113 |
| 3,703,363 | 11/1972 | Heaton et al. | 65/81 |
| 1,972,717 | 9/1934 | Schutz | 65/79 |
| 337,692 | 3/1886 | Miller | 65/77 |

Primary Examiner—Frank W. Miga
Attorney, Agent, or Firm—Parmelee, Miller, Welsh & Kratz

[57] ABSTRACT

Tumblers and the like articles are produced from vitreous, plastic and similar materials by a continuous step by step production method, wherein each article may be first preliminarily formed as a parison and then blow-formed as a blank or semi-finished article. While the blank is still hot or semi-plastic, dimples or depressions are formed in its side and bottom walls to produce an indented or dimpled type of shape. Side wall dimpling is accomplished by providing transfer finger pairs with pressure nubbins and preliminarily employing the fingers as clamping pressers; a bottom end dimple is produced by providing a bottom closure plate of a vacuum head assembly with a centrally disposed nubbin and applying suction force to draw the article up into the head.

15 Claims, 9 Drawing Figures

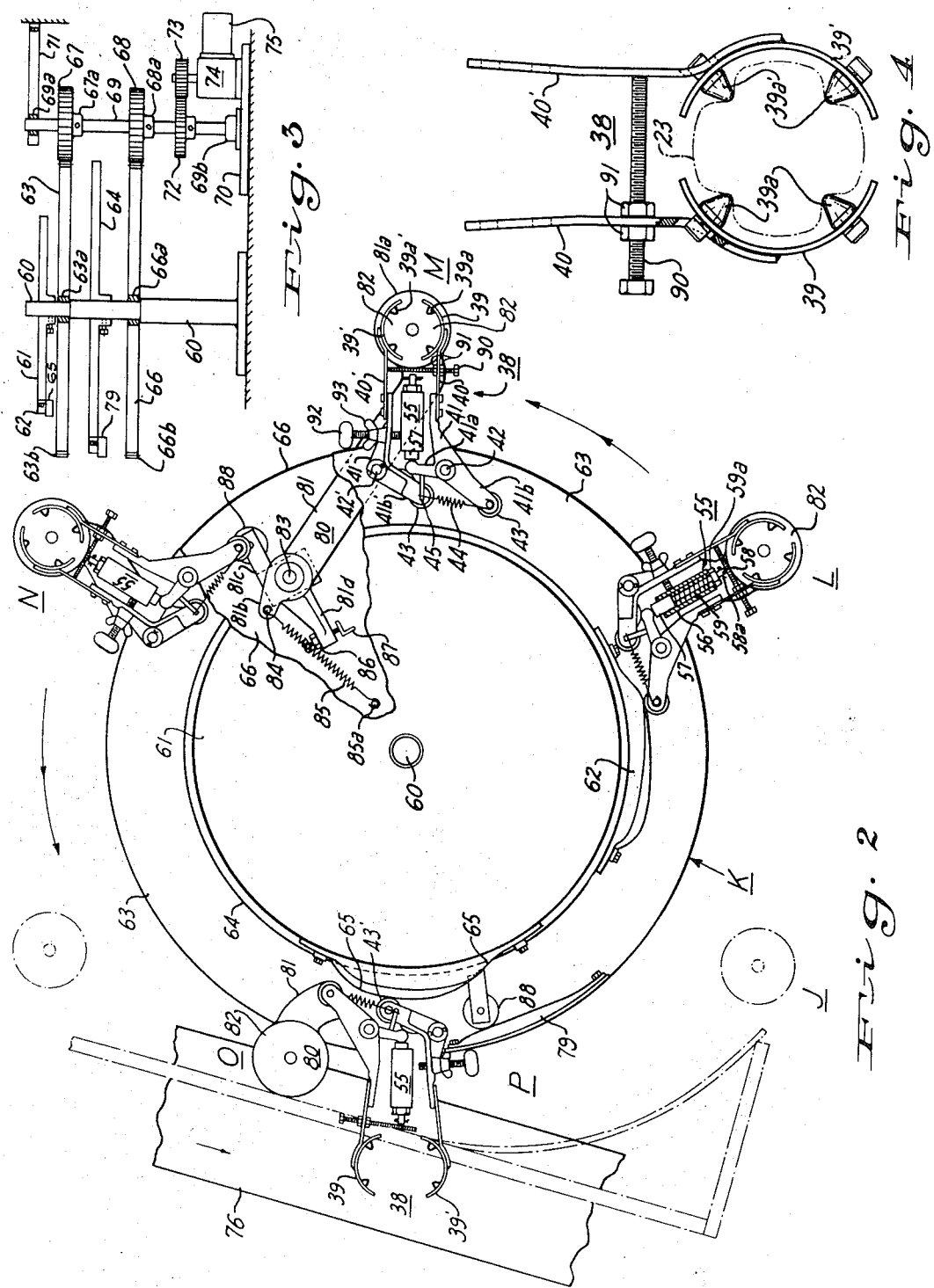

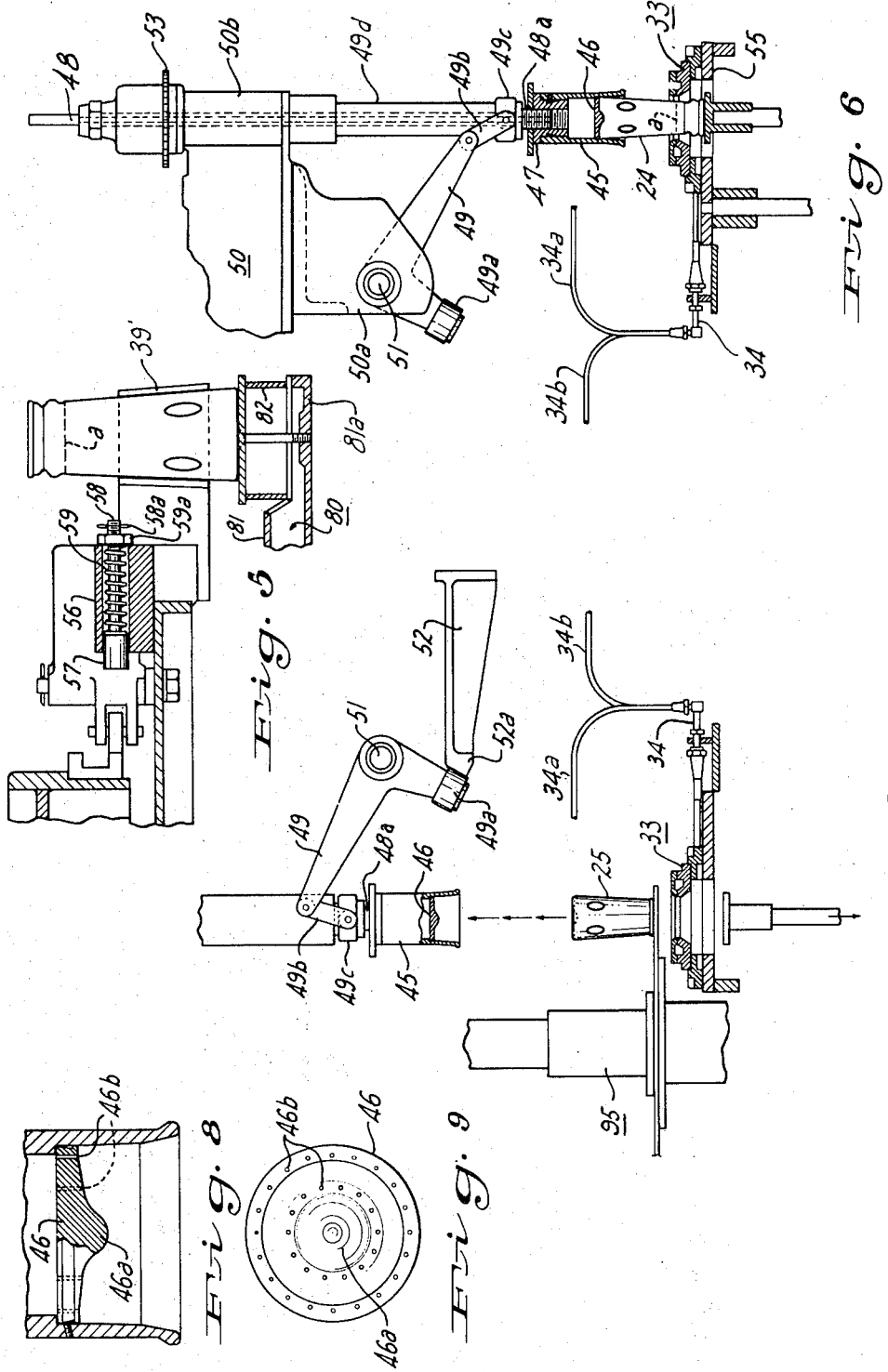

GLASSWARE DIMPLING

This application is a division of our application Ser. No. 80,992 entitled "Glassware Dimpling" filed Oct. 15, 1970 now U.S. Pat. No. 3,705,026 issued Dec. 5, 1972.

This invention relates to the making of articles of ware such as tumblers, from vitreous, plastic and similar materials that retain formable plasticity after principal shaping or forming operations. A phase of the invention deals with the production-forming of dimples, recesses or indentations in a spaced relation in the walls of a tumbler or other article of ware, such that the article is structurally strengthened, may be securely gripped even when damp or wet, and has a characterizing appearance.

There has been a need for an improved tumbler or the like that can be easily gripped in a natural manner with exceptional firmness and which presents a distinctive and pleasing appearance. Tumblers have heretofore been produced productionwise in a continuous manner by a mold pressing operation, and better quality glassware has been produced by pressing and blowing operations. The need has been for a good quality tumbler or like article of ware that can be provided with symmetrically produced dimples or indentations in its wall, without appreciably increasing the time or expense involved in producing a conventional tumbler with smooth side walls. Although it is recognized that indentations in a heated parison can be produced manually by a pick or a stick, this is a tedious and time consuming operation and does not assure a desired uniformity of spacing, shape or a symmetry of the dimples or indentations.

The present invention thus deals with developing procedure and apparatus for mechanically and accurately, as well as efficiently and effectively, successively and progressively forming dimples or indentations in an article of ware, while it is still hot from its forming operation, and without interrupting a continuous processing line movement, all in such a manner as to utilize time normally employed for transferring the articles from one station or operation to another. It has been determined that the problem should be approached from the standpoint of forming the dimples or indentations after the article has been at least preliminarily formed and before it has cooled sufficiently to mitigate against the use of its inherent retained heat. It will be appreciated that the reheating of a temperature-sensitive article, such as of vitreous material, greatly increased the expense involved and has to be very carefully controlled to avoid breaking or cracking the article.

In the illustrated embodiment of the invention, a blank is preliminarily formed in a press mold from a hot gob, parison or charge of vitreous or plastic material and then transferred to a paste mold and blown to a blank or article of substantially final shape. Transfer gripping finger pairs are used to transfer the thus substantially formed, still plastic blank or article from the blow or paste mold to conveyor means. Such gripping finger pairs have projecting nubbins and are initially applied with a positive pressing-in force in such a manner as to form dimples in a spaced relation about side wall portions of a progressive series of blown blanks or articles in successions, and to then relieve the dimple forming pressure and retain the articles on a turret for transfer to a conveyor. Another pair of fingers is shown employed to grip and lift each article off the conveyor and invert it and then move it into position at a cutting-off or burn-off station. At the cutting-off station, each article or blank may be rotated and the cullet about its open mouth cut-off and edge-beaded as by a burner. A hollow vacuum head assembly is employed to grip the bottom portion of the article or blank and to indent or dimple it by vacuum force applied thereto that is also employed for holding the article in position while it is being rotated at the burn-off station. The vacuum head assembly defines a blank-receiving socket whose base has a central nubbin, rounded or convex projection or knob which is moved into the end wall of the hot articles or blank. Thereafter, the completely formed article may then be moved through an annealing furnace or lehr to cool it down to room temperature and provide a finished product.

It has been an object of the invention to provide an economical production method of forming dimples or recesses in the walls of an article of ware such as a glass tumbler.

Another object of the invention has been to devise simple and efficient procedure for effectively producing a desired dimpling in a side wall or paneling and, if desired, in a bottom end wall of a hollow, glasslike article of manufacture.

Another object of the invention has been to form or shape dimples or depressions in wall portions of an at least partially formed article of ware in a somewhat semi-plastic temperature-retaining condition, without adversely deforming the article from the standpoint of its desired final shape.

Another object has been to provide a continuous high speed method of forming wall depressions in a symmetrical manner in an article of ware such as a tumbler.

A further object of the invention has been to develop an accurate production line type of dimple-forming operation for an article of ware, such as a tumbler, that may be accomplished without slowing down conventional operations of a production line.

A further object of the invention has been to utilize latent heat in an at least partially formed tumbler or the like in effectively forming recesses or dimples in its wall portions.

A still further object has been to enable the successful forming of dimples or recesses symmetrically in side walls of a tumbler as well as in a bottom wall thereof.

These and other objects of the invention will appear to those skilled in the art from the illustrated embodiment and the claims.

FIG. 2 is a top plan view of a turret or table apparatus that may be employed in accordance with the invention to transfer articles successively in the form of hollow shaped blanks from a forming mold to a conveyor and to also form dimples in side walls of the blanks during their movement.

FIG. 3 is a reduced side view in elevation showing table apparatus of FIG. 2 and means for supporting its table members and for driving its pair of rotatable, vertically spaced apart table members.

FIG. 4 is a greatly enlarged top plan view showing a pair of transfer fingers being utilized to form side dimples or indentations in a blank.

FIG. 5 is a fragmental side view in elevation on the scale of FIG. 2, particularly illustrating a support arm assembly as well as a transfer assembly for a blank, as carried on rotating turret or table apparatus of FIG. 2.

FIG. 6 is a vertical view in elevation taken from an opposite side of the apparatus of FIG. 7 and showing a vacuum head in a "down", dimple-forming and article-holding position, as well as illustrating means for rotating the vacuum head.

FIG. 7 is a fragmental vertical view in elevation on the scale of FIG. 6, further illustrating apparatus of step or station G of FIG. 1 and showing means for raising and lowering it into and out of position with respect to a blank as well as means for moving the blank into and out of vertical alignment with a cullet-severing or cutting-off burner.

FIG. 8 is a fragmental vertical section in elevation on the enlarged scale of FIG. 4 and illustrating details of the construction of a vacuum head used as illustrated by step G of FIG. 1 and in FIG. 6.

FIG. 9 is a bottom plan view on the scale of FIG. 8, particularly illustrating a perforated base and dimple forming wall of the vacuum head of FIG. 8.

Figure 1:
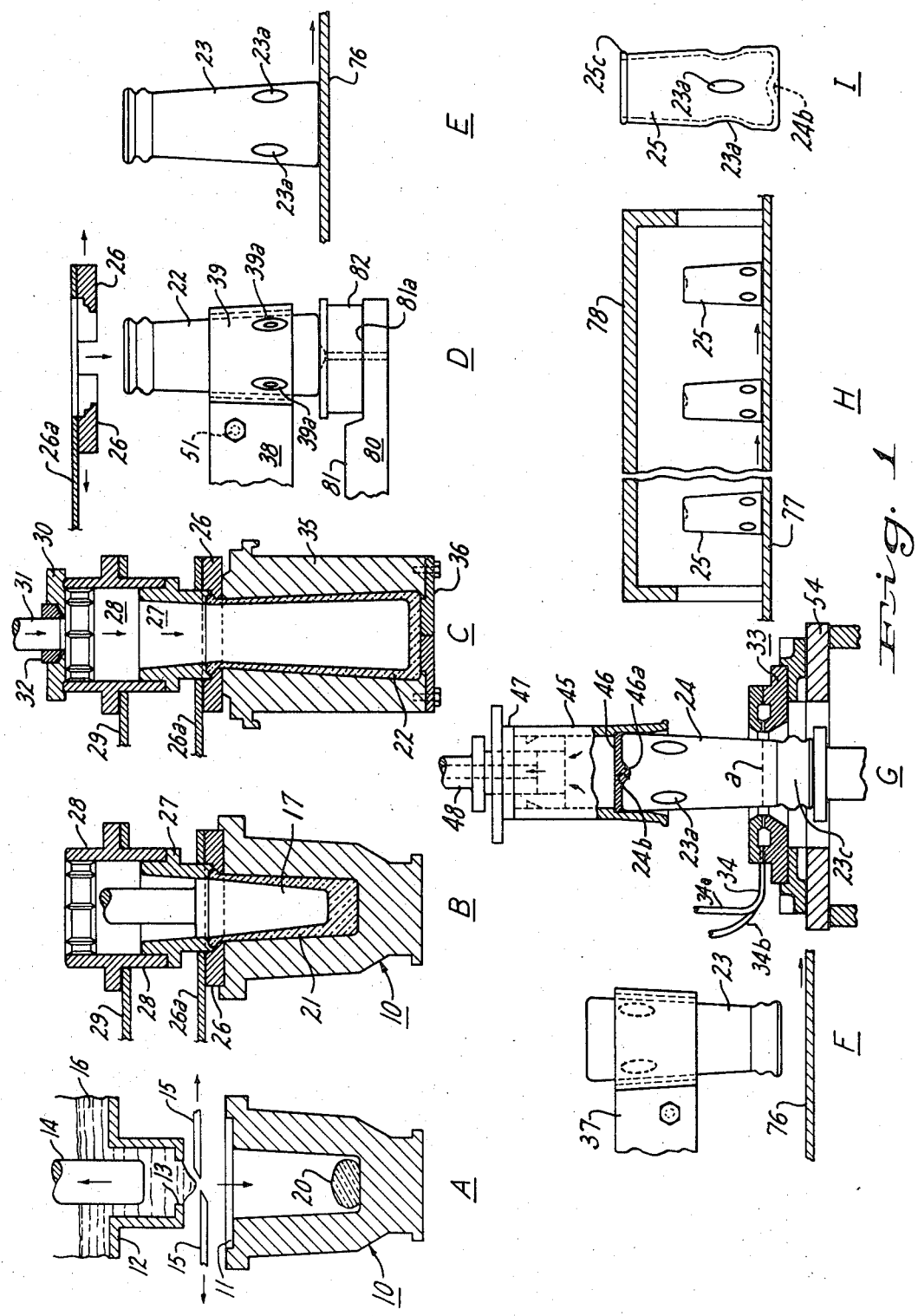
FIG. 1 is a somewhat diagrammatic layout in side elevation illustrating procedure and apparatus for making articles in accordance with the invention; this figure shows step by step or station to station operations involved in forming a completed article of ware such as a glass tumbler.

Although the process involved will be described from the standpoint of utilizing conventional glass article forming machinery in the nature of press mold and paste mold machines, a transfer turret, and burn-off equipment for forming a safety lip edge, it will be apparent that the invention may be applied as well to any compatible forming of resin as well as vitreous articles of ware.

Referring particularly to FIG. 1, the letters A through I, inclusive, have been employed to illustrate step by step procedure or operative stations employed in a system constructed and utilized in accordance with the invention. To initiate the operation, a gob, parison or charge of molten vitreous or plastic material 20 is dropped into a press mold 10 through its open mouth portion. The gob 20 will be of sufficient size to provide an initial, pressed-out parison shape 21 illustrated at B. The gob 20 is shown provided by a glass melting furnace 12 whose molten material 16 is fed in a controlled manner by a reciprocating plunger 14 to flow outwardly through a bottom orifice 13 for severance by a pair of cooperating shear blades 15.

At step or station B, a conventional presser head 17 is shown in a fully "down" position wherein a preliminary shape or parison 21 is formed within the mold 10. Enlarged mouth portion 11 of the mold 10, at this time, is positioning a partible or segmented neck ring assembly 26 which is carried on a support arm 26a. The neck ring assembly 26 has an inner wall cavity cooperating with an end cavity of a cooperating upper collar member 27 to thus form a preliminary lip about the parison 21. An upper hollow mold part 28 is carried by a support arm 29 for both swinging and upper and lower movements, such that the part 28 can be swung into alignment with the mold 10, and thereafter lowered into and raised out of a cooperative fitting relation with the collar 27.

At step or station C, the assembly represented by 26, 27 and 28 carries the parison 21 suspended from its lip edge to a position at which a partible paste or blow mold 35 may be employed. The mold 35 is shown provided with bottom closure members 36 and as utilizing a blow head 30 to form a blank or semi-final shape or article 22 therewithin. As illustrated, the blow head 30 may carry a blow pipe 31 that is mounted by a gasket 32 in a sealed-off relation with respect thereto. After the forming of hollow blank 22, the mold 35 is opened, the assembly 27, 28, 29 and 30 is removed, and the neck ring assembly 26 is employed to move the blank 22 into position with respect to a support arm assembly 80 (see D of FIG. 1). A finger operating transfer unit 38 (see also FIG. 4) is then moved into a gripping position about the side wall of the blank 25. When cooperating pair of transfer fingers 39 and 39' are closed about the blank 22 (see station D of FIG. 1 and station J of FIG. 2), then the neck ring assembly 26 is opened and the arm 26a is employed to move it out of position.

Step or station D is not only illustrated in FIG. 1, but rather fully illustrated in detail in FIGS. 2, 3 and 4 from the standpoint of the operations and the apparatus involved. With particular reference to FIG. 2, the operation starts when the support arm assembly 80 is positioned at station J of a turret or rotating table apparatus. As illustrated, the turret or table apparatus (see also FIG. 3) has a vertical shaft or central support member 60 that carries an uppermost stationary cam disc or table 61 secured thereto, an uppermost rotating table 63 that is journaled by bearings 63a thereon, an under-positioned and spaced second stationary cam disc or table 64 secured thereto, and a second under-positioned and spaced secondary rotating table 66 that is journaled thereon by bearings 66a. The tables 63 and 66 are shown rotated counterclockwise in synchronism by an electric motor 75, gear reduction unit 74, meshing gears 72 and 73, vertical drive shaft 69, drive pinions 67 and 68, and respective peripheral gear teeth 63b and 66b. The drive shaft 69 is journaled at its upper end by bearings 69a that are carried by an upper stationary support member 71, and is journaled at its lower end by bearings 69b that are carried by a lower stationary base or platform member 70.

A side-positioned and projecting cam track 62 is bolted to the upper stationary table 61 and is engaged by cam roller 43 to exert a positive, more than gripping force upon a pair of support arms 40 and 40' of a blank transfer unit or assembly 38 to form symmetric dimples by inward pressure applied to rounded or conical-shaped forming knobs, protuberances or head projections 39a and 39a' (see FIG. 4) that are respectively carried by cooperating, curvilinear, clamping or gripping transfer fingers 39 and 39'. After this preliminary operation of forming dimples by movement along the cam track 62, then the dimple forming pressure which, for example, may be in the neighborhood of 5 to 10 lbs. per sq. in. is relieved, and nominal holding pressure is thereafter maintained by the fingers 39 and 39' with respect to the article or blank during its full movement along the turret table structure, as represented by stations L, M, N and O. During movement beyond station O, and particularly between stations O and P, the finger 39' is opened to move away from the finger 39, as illustrated in FIG. 2, and to discharge the side-dimpled article or blank 23 on a continuous belt conveyor 76. See also E of FIG. 1.

The partially formed article or blank 23 is then carried on the conveyor 76 in its upright position, as indicated by E, to a delivery station represented by F, at which time, a conventional side wall gripping transfer finger assembly 37 that is mounted for turn-over or rotative movement, is employed to grip the body of the article 23, to thereafter invert it with its open mouth portion facing downwardly, and to then insert it in position within a cutting or burning-off apparatus (see G of FIG. 1 and see FIG. 6). At this time, a vacuum head assembly 45 of hollow cylindrical shape is moved downwardly until a centrally disposed nubbin, knob or rounded projection 46a on its bottom closure plate 46 is pressed centrally into the base or bottom wall portion of the blank or article 24 to form a central dimple or depression 24b. As shown at station G and also in FIGS. 8 and 9, the closure plate or wall 46 is removably secured in position within the head and is provided with a through-extending group of fluid passageways 46b to enable the application of positive suction force to the base of the blank 24. Thus, vacuum or suction holding force is applied to the bottom end portion of the blank 24 through the passageways 46b to securely grip and retain the blank 24 in position during its insertion into and removal from a burn-off unit 33. See also FIG. 7. The unit 33 has an annular burner whose fuel line 34 is supplied with a suitable combustible mixture from gas line 34a and air line 34b. The head 45 is connected through a pipe 48 to a suitable source of suction. An adaptor 47 holds or mounts the pipe 48 in a sealed-off relation with the chamber of the head 45.

Rotation of the head 45 is effected through the agency of a gear 53 or sprocket (see FIG. 6) which rotates the pipe 48 within a mounting sleeve 50b to thus rotate the blank 24 while a fuel mixture in introduced through the line 34 into the burner unit 33. The rotation of the blank as thus effected, enables its mouth cullet to be burnt-off or severed along the dotted line a of FIG. 6 and, at the same time, causes the formation of a beaded lip edge about the blank 24 to provide a completed article 25. As shown in FIGS. 6 and 7, a frame part 50 carries the mounting sleeve 50b and a downwardly extending bracket 50a that provides a mounting for a cam-operated, vacuum head raising and lowering lever system. An angle-shaped, dog leg member 49 is pivotally mounted by a pin 51 on the bracket 50a and has a cam roller 49a rotatably mounted on its one end for operating engagement with a cam face 52a of a cam track member 52. Since the head 45 and the burner unit 50 will ordinarily be mounted on a rotating turret or table, the member 52 may have a stationary mounting. The other end of the member 49 is pivotally connected through a link 49b to collar 49c. As shown in FIG. 6, the collar 49c and its sleevelike spindle 49d rotatably carry the pipe 48 and its threaded, lower mounting end portion 48a. It will be noted that the pipe 48 thus has an adjustable mounting within the adaptor 47. The cam roller 49a and track 52a effect a raising and lowering movement of the head 45 (see FIG. 7).

FIG. 6 shows the head 45 in its article-holding and rotating "down" position for cutting or burning-off cullet from the mouth portion of the blank 24, and FIG. 7 shows the head 45 raised to lift the finished article 25 out of the burner unit 33 and to then position it on the shelf of a swingable take-out unit 95 by the release of its suction holding force.

The take-out unit 95 may be used to place the finished tumbler or article of ware 25 on a continuous belt 77 (see H of FIG. 1) to thereafter move it through a conventional annealing lehr or oven 78, at which it may be annealed or tempered and its temperature reduced down to room temperature. At station I of the same figure, a representative completed article or tumbler 25 is shown having a group of somewhat lengthwise-elongated, equally peripherally spaced-apart, substantially symmetrical, side or panel wall recesses or dimples 23a and a central bottom or base recess or dimple 24b. The dimples 23a may, as shown, have a vertically elongated or somewhat elliptical shape, while the dimple 24b will preferably be of substantially circular-conical shape. Although I have illustrated a procedure which involves pressing and blowing operations, it will be apparent to those skilled in the art that the articles may be fully formed by a pressing operation and thereafter provided with side dimples or side and bottom dimples. The press and blow type of procedure, however, enables the providing of a thin walled and a much better quality of tumbler or other article of ware and one which has no mold marks or seams.

The turret or table apparatus is, as shown by way of representation particularly in FIGS. 2 and 3, aside from the shape and utilization of its transfer fingers, merely representative of a suitable apparatus for handling the blank while it is being transferred from one forming station to another and particularly, while dimples are being formed in its side wall or panel portions. Each pair of support arms 40 and 40' that carry the transfer fingers 39 and 39' is shown provided with a threaded adjusting bolt or screw 90 which is mounted on one arm 40 by, for example, a pair of nuts 91 to engage the other arm 40'. The threaded bolt or screw 90 thus provides means for adjusting the maximum cooperating closed relationship of the fingers 39 and 39' with respect to each other to thus adapt them for different sizes of blanks or articles and limit or control the depth of the dimples which are formed by the knobs or projections 39a and 39a' (see particularly FIG. 4).

As shown particularly in FIG. 2, the support arm 40 is pivotally mounted on the upper rotating table 63 by a pin 42, has a side-positioned dog leg portion 41a, and a cam-operated, back extension portion 41b. The extension arm portion 41b, in turn, rotatably carries a cam roller 43. The other arm 41' is of similar construction in that it also has a pivot pin 42' mounting it on the table 63 and a backwardly projecting, cam-operated extension arm portion 41b' that rotatably carries a cam roller 43' thereon. However, instead of a dog leg portion, it is provided with a threaded adjustment pin 92 that is adapted to adjustably extend therethrough to, at its inner end, engage the housing of a spring-loaded plunger unit 55. A wing nut 93 is positioned on the stem of 92 for locking it in an adjusted position. The pin 92 limits the innermost movement of the arm 40' with respect to the other arm 40.

The plunger unit 55 (see also FIG. 5) is provided with a housing 56, a plunger 57 that projects through the back end of the housing 56, a piston rod 58 that extends along the housing 56 and at its back end carries the plunger 57, and a tension spring 59 that normally urges the plunger 57 backwardly-outwardly. The piston rod 58 extends through the front end of the housing 56 and is threaded thereat to receive a nut 59a that is adjustable to limit its maximum inward or backward movement. A cotter pin 58a extends through the front end of the piston rod 58 to hold it in a mounted relation and to retain the nut 59a on the rod. The spring 59 normally applies a backward outward movement on the plunger 57 within the housing 56 that is limited by abutment of the nut 59a with the front end of the casing or housing 56'.

The dog leg portion 41a, as shown, has a rounded forward end portion, one side of which is engaged by the plunger 57, and the other side of which engages a rounded, slight edge projection of the cam-operated back arm portion 41b' of the support arm 40' to thus serve as a means for retaining a minimum holding pressure on the pair of tongs or fingers 39 and 39' until the blank 23 reaches a take-out or delivery station. The spring-loading of the plunger 57 of the unit 55 thus provides a minimal flexible type of gripping or holding force for the fingers after the finger 39 has been subjected to an initial, relatively higher, inward force that forms with the opposing finger 39' the dimples in the side wall of the blank 22.

The cam roller 43 of each assembly 38 is carried on a higher vertical plane that the other cam roller 43' of the same assembly, and is the only one positioned to engage an outwardly projecting cam track 62 to thus apply a positive pressing-in force to the frusto-conical knobs or dimple forming parts 39a and 39a' through the agency of the arm 40, while a blank 22 is being moved on the turret apparatus, for example, from position K towards position L of FIG. 2. A cross-connecting tension spring 44 between the back ends of the arm portions 41b and 41b' of the assembly 38 tends to move the fingers 39 and 39' to an open relation with respect to each other, but is offset by the greater finger-closing force exerted by the spring 59 of the plunger unit 55. Thus, the springs 44 and 59 provide flexibly opposed clamping or closing forces to the fingers 39 and 39', such that a flexible, relatively minor article gripping or holding force may be applied after the positive dimple-forming force accomplished by the cam track 62 in cooperative engagement with the roller 43 has been removed (adjacent station L). It will thus be apparent from a study of FIG. 2 that substantially from station L, the gripping action of the fingers 39 and 39' is flexible and minimal and only sufficient to hold the blank (see also FIG. 5) on a bottom support shelf 82 that is carried by the arm 81 of a support arm assembly 80. It will be noted that the support arm assembly 80 is pivotally mounted by a pin 83 on the lower or secondary rotating table 66 to swing outwardly and inwardly with respect thereto. It normally is in its outward swung position (see station M of FIG. 2) when the article or blank is being advanced counterclockwise from station K through stations L, M and N, but is swung backwardly or inwardly between stations O and P to thereby uncover the bottom end of the side wall dimpled article or blank 23. Thus, when the fingers 39 and 39' have been opened, the side-dimpled blank 23 may be delivered to the belt conveyor 76.

The swing or take out arm 81 is moved or swung inwardly by a cam track 79 (see FIGS. 2 and 3) that projects downwardly from the underside of the fixed-position cam table 64. The track 79 is engaged by cam roller 88 along its inner side to swing the arm 81 to a position represented at station O in FIG. 2. At substantially the same time, a cam track 65 that is carried in an under-projecting relation on the upper cam table 61 engages the roller 43' of the support arm 40' to thus swing its finger 39' outwardly to an open or separated position with respect to the other finger 39. This fully releases the blank 23 to position it on means, such as continuous conveyor belt 76 (see also station E of FIG. 1).

The finger closing cam track 62 has an upper positioning with respect to the cam track 65 and thus, it only engages the roller 43 of the arm 40 to apply the dimple forming force to the blank or article of ware 22, directly through the agency of the finger 39 and its knobs or nubbins 39a and indirectly through the finger 39' and its nubbins 39a'. Thus, when the assembly 38 is being moved from station K to station L, the roller 43' which is the finger opening roller bypasses the cam track 62 in an underposition with respect thereto. On the other hand, when the assembly 38 reaches the delivery area between stations O and P, then only the roller 43' which is the finger opening roller is engaged by the lower positioned cam track 65. The cam track 79 swings the support arm assembly 80 clockwise-inwardly when the cam roller 88 engages its inner side.

The support arm assembly 80 thus serves in cooperating relation with the transfer assembly 38 to aid in carrying the blank 22, 23 in a counterclockwise rotative path, for example, from station J to slightly beyond station O. The swing arm 81 of the assembly 80 is pivotally mounted at its inner end by pin 83 on the lower rotating table 66 out of the way of the transfer finger assembly 38. The arm 81, in addition to having a downwardly offset support forward end portion 81a for receiving and carrying a blank supporting shelf 82, at its other end, has a projecting integral dog leg extension portion 81b, a forwardly or outwardly extending arm portion 81c that rotatably carries the cam roller 88, and a backwardly extending stop limit arm portion 81d. The dog leg extension 81b has a pin 84 that mounts one end of a tension spring 85 thereon. The other end of the tension spring 85 is secured on a pin 85a that extends upwardly from the lower rotating table 66. The spring 85 thus resiliently urges the arm 81 in an outward swung direction, as limited by an angle-shaped stop piece 87 that is secured on the table 66 and that is engaged by an adjusting screw or bolt 86. The adjustment bolt or screw 86 is carried by a stop limit arm portion 81d. When the cam roller 88 moves into inner or inside engagement with the cam track 79, it positively swings the assembly 80 and the arm 81 inwardly to the position shown in FIG. 2 to uncover the bottom of the side-dimpled blank 23. This may be done either simultaneously with the opening of the finger 39' or initially, before the opening thereof. As a result, the blank 23 is free to be dropped or placed on the continuous conveyor 76.

We claim:

1. In a procedure for making a hollow-shaped article from a vitreous or plastic material, forming a hot charge of the material into a hollow-shaped blank, and then simultaneously inwardly depressing peripherally spaced-apart side wall portions of the blank and forming dimples therein, while it is still plastically deformable from the heat of the charge, and while transferring the blank to a cutting-off station.

2. In a procedure as defined in claim 1, thereafter depressing a central portion of a bottom wall of the blank and forming a dimple therein while it is still plastically deformable from the heat of the charge.

3. In a procedure as defined in claim 2, simultaneously with the forming of the dimple in the bottom wall of the blank, burning-off a mouth cullet therefrom and forming a beaded edge about the burnt-off portion thereof.

4. In a procedure as defined in claim 3, holding the bottom wall of the blank within a vacuum head while forming the dimple in the bottom wall, and employing the vacuum head to rotate the blank during the burning-off of the cullet and the forming of a beaded edge.

5. In a procedure as defined in claim 1, gripping the blank about its side wall portions while transferring it from a shape-forming station to the cutting-off station, applying an initial side-pressing-in force to the side wall portions being gripped and forming the dimples therein, and thereafter relieving the pressing-in force and maintaining a gripping force on the blank until it reaches the cutting-off station.

6. In a procedure as defined in claim 1, inverting the blank before it reaches the cutting-off station to position its mouth cullet in a downwardly facing position, and at the cutting-off station burning-off a mouth cullet from and forming a lip edge about the blank.

7. In a procedure as defined in claim 6, depressing a central portion of the bottom wall of the blank at the cutting-off station and forming a bottom dimple therein while the blank is still hot from the heat of the charge.

8. In a procedure as defined in claim 7, moving the blank as a finished article from the cutting-off station and then into and through an annealing lehr.

9. In a procedure as defined in claim 1, first press-forming the hot charge into a preliminary shaped blank, and then blow-forming the preliminary shaped blank into a final hollow blank shape before forming dimples in the side wall portions thereof.

10. In a procedure as defined in claim 9, picking-up the blown blank on a supporting arm and gripping it about its side wall portions with a pair of substantially complementary opposed gripping fingers, providing the gripping fingers with projecting nubbins, moving one of the fingers with a positive pressing-in force towards the other in their gripping relation about the side wall portions of the blank and thereby forming dimples about the side wall portions, removing the positive pressing-in force and maintaining the gripping force on the fingers while transferring the dimpled blank to the cutting-off station.

11. In a procedure for making a relatively thin-walled shaped article such as a tumbler from vitreous or plastic material, introducing a hot gob of the material into a hollow mold and forming a hollow blank therefrom within the mold, picking-up the blank and transferring it to a cutting-off station and during the transfer to the cutting-off station forming symmetrical depressions in the wall thereof.

12. In a procedure as defined in claim 11, at the cutting-off station forming a depression in a bottom wall of the blank and cutting-off cullet therefrom.

13. In a procedure as defined in claim 11, picking-up the blank while it is still hot from the heat of the gob, and applying a gripping force thereto while applying localized areas of inward-deforming force to and forming dimples in and about the wall of the blank.

14. In a procedure as defined in claim 13, thereafter gripping a bottom end portion of the blank at the cutting-off station and applying a localized area of inward-deforming force to the bottom wall of the blank and forming a dimple therein.

15. In a procedure as defined in claim 14, rotating the blank while gripping its bottom end portion and while cutting-off cullet from an open mouth portion thereof.

* * * * *